(12) United States Patent
Komiya et al.

(10) Patent No.: US 9,065,318 B2
(45) Date of Patent: Jun. 23, 2015

(54) ROTOR CORE AND METHOD OF MANUFACTURING THE SAME

(71) Applicants: Daisuke Komiya, Kitakyushu (JP); Toshio Goto, Kitakyushu (JP)

(72) Inventors: Daisuke Komiya, Kitakyushu (JP); Toshio Goto, Kitakyushu (JP)

(73) Assignee: MITSUI HIGH-TEC, INC., Kitakyushu-shi (JP)

( * ) Notice: Subject to any disclaimer, the term of this patent is extended or adjusted under 35 U.S.C. 154(b) by 334 days.

(21) Appl. No.: 13/829,337

(22) Filed: Mar. 14, 2013

(65) Prior Publication Data

US 2014/0265718 A1    Sep. 18, 2014

(51) Int. Cl.
*H02K 15/02* (2006.01)
*H02K 1/22* (2006.01)
*H02K 1/28* (2006.01)

(52) U.S. Cl.
CPC ........... *H02K 15/02* (2013.01); *Y10T 29/49012* (2015.01); *H02K 1/28* (2013.01)

(58) Field of Classification Search
CPC ........... H02K 15/02; H02K 1/22; H02K 1/28; Y10T 29/49012
USPC .................................. 310/261.1; 29/598, 609
See application file for complete search history.

(56) References Cited

U.S. PATENT DOCUMENTS

| 5,044,237 | A | * | 9/1991 | Frame | 83/41 |
| 5,539,974 | A | * | 7/1996 | Isayama | 29/598 |
| 5,649,349 | A | * | 7/1997 | Greenway | 29/598 |
| 6,047,460 | A | * | 4/2000 | Nagate et al. | 29/598 |
| 7,298,064 | B2 | * | 11/2007 | Yamamoto et al. | 310/216.057 |
| 2001/0000549 | A1 | * | 5/2001 | Neuenschwander | 29/598 |
| 2005/0229384 | A1 | * | 10/2005 | Yamamoto et al. | 29/598 |
| 2012/0248918 | A1 | * | 10/2012 | Itou et al. | 310/156.48 |

FOREIGN PATENT DOCUMENTS

| JP | 56-44367 A | 4/1981 |
| JP | 2008-312321 A | 12/2008 |
| JP | 2010-045973 A | 2/2010 |
| JP | 2011-036068 A | 2/2011 |
| JP | 2011-254699 A | 12/2011 |
| JP | 2012147597 A | * | 8/2012 |

OTHER PUBLICATIONS

Japanese Office Action dated Jun. 18, 2013, issued in corresponding Japanese Patent Application No. 2012-001704.
Japanese Office Action dated Oct. 29, 2013, issued in Japanese Patent Application No. 2013-042071 (2 pages).

* cited by examiner

*Primary Examiner* — Alex W Mok
(74) *Attorney, Agent, or Firm* — Westerman, Hattori, Daniels & Adrian, LLP

(57) ABSTRACT

A method of manufacturing a rotor core includes a first process of punching out punched holes 22, 23 forming outlines of keys 13, 14 in a thin metal strip 18, the holes 22, 23 including inside areas 25 located inside a shaft hole 12 and outside areas 26 continuous from the areas 25 and located outside the hole 12; a second process of punching out the hole 12 including recesses 35, 36 to avoid the keys 13, 14 and communicating with the holes 22, 23; and a third process of punching out an outline of a core sheet 11 having the hole 12 and laminating the sheets 11. Thereby, a shaft hole having keys is formed precisely, a thickness deviation of core sheets is eliminated, and a rotor core having homogeneous magnetism is provided.

6 Claims, 7 Drawing Sheets

ROTOR CORE AND METHOD OF MANUFACTURING THE SAME

TECHNICAL FIELD

The present invention relates to a rotor core including a shaft hole having a key protruding inward and a method of manufacturing the rotor core, the rotor core used for a motor.

BACKGROUND ART

Conventionally, when a rotor core (or a stator core) is manufactured by punching out annular core sheets from a magnetized thin metal strip and laminating the core sheets, the rotor core is uniformly fabricated by reducing a thickness deviation and a magnetic deviation in a circumferential direction. Specifically, each of the annular core sheets is relatively rotated by a predetermined angle (for example, the rotor core is rotated while the core sheets are laminated thereon) and the core sheets are laminated to a predetermined thickness (i.e., the rotor core is manufactured by rotating and laminating the core sheets).

Patent Literature 1 discloses a method of manufacturing a rotor core, in which angular positions of a punch and a die to make a shaft hole in a core sheet are changed by a predetermined angle (90 degrees in this example) to form a recessed key at a different position in each of the core sheets, and the core sheet just-provided with the recessed key is laminated on an assembly of the core sheets already laminated in the die while the assembly is being rotated by the predetermined angle, i.e., the core sheets are rotated and laminated.

Patent Literature 2 discloses a rotor core including projecting (convex) keys opposed to each other in a shaft hole, in which arc-shaped portions whose tangential directions are continuous with lateral sides of the keys are provided at both sides of the keys in a circumferential direction of the shaft hole so that stress concentrations at bottoms of the keys caused during a high-speed rotation of a rotor are reduced.

CITATION LIST

Patent Literature

[Patent Literature 1] Japanese Unexamined Patent Application Publication No. S56-044367
[Patent Literature 2] Japanese Unexamined Patent Application Publication No. 2008-312321

SUMMARY OF INVENTION

Technical Problem

However, in the method disclosed in Patent Literature 1, it is necessary to form the keys while rotating the paired punch and die, which requires an extremely complex mechanical configuration. Further, positional accuracy of each of the keys is reduced, and accuracy between a shaft inserted in the shaft hole of the rotor core and the shaft hole is reduced. Thus, the method is not suitable for (producing the rotor core used for) a high-precision motor.

Further, an object of Patent Literature 2 is to produce a high-speed rotor by reducing the stress concentrations caused at the bottoms of the keys, thus a problem discussed therein is different from the present invention. Also, as in Patent Literature 1, no description is provided in Patent Literature 2 at all about wear of the punch and the die caused when the shaft hole is formed in the core sheet, a problem of metal clippings made in pressing, improvement of mechanical accuracy by simplifying the configurations of the device, etc.

The present invention has been made in view of the above circumstances, and it is an object of the present invention to provide a rotor core including keys protruding in a shaft hole and a method of manufacturing the rotor core, in which metal clippings are prevented from being made by punching-out, the shaft hole having the keys are precisely formed, a thickness deviation of a core sheet is reduced, and a magnetism of the core sheet is homogenized.

Solution to Problem

To accomplish the above object, a first aspect of the present invention provides a method of manufacturing a rotor core, the rotor core formed by laminating a plurality of core sheets each punched out from a magnetic thin metal strip, each of the core sheets including a shaft hole in a center, the shaft hole including keys protruding radially inward of the core sheet, the method comprising: a first process of punching out punched holes in the thin metal strip by a first punch and a first die paired with the first punch, the punched holes forming outlines of the keys, the punched holes including inside areas located inside the shaft hole and outside areas continuous with the inside areas and located outside the shaft hole; a second process of punching out the shaft hole by a second punch and a second die paired with the second punch, the shaft hole continuous with the punched holes, the shaft hole including recesses to avoid the keys; and a third process of punching out outlines of the core sheets each provided with the shaft hole and laminating the core sheets.

A second aspect of the present invention provides the method according to the first aspect, wherein the keys are disposed opposite to each other at a 0-degree position and a 180-degree position of the shaft hole, and the core sheets are rotated 180 degrees to the core sheet to be laminated on the core sheets in the third process.

A third aspect of the present invention provides the method according to the first aspect, wherein the core sheets whose outlines are punched out in the third process include a first core sheet and a second core sheet formed at different positions in the thin metal strip; the first core sheet includes the punched holes, a first auxiliary hole, and a second auxiliary hole formed in the first process, the punched holes opposite to each other at a 0-degree position and a 180-degree position of the shaft hole formed in the second process, the first auxiliary hole and the second auxiliary hole formed at a 90-degree position and a 270-degree position of the shaft hole, the first and second auxiliary holes including the inside areas, outer lines of the first and second auxiliary holes located outside the shaft hole; the second core sheet includes the punched holes, a third auxiliary hole, and a fourth auxiliary hole formed in the first process, the punched holes opposite to each other at the 90-degree position and the 270-degree position of the shaft hole formed in the second process, the third auxiliary hole and the fourth auxiliary hole formed at the 0-degree position and the 180-degree position of the shaft hole, the third and fourth auxiliary holes including the inside areas, the outer lines of the third and fourth auxiliary holes located outside the shaft hole; the second punch and the second die include a blade to form the shaft hole, blades to punch out the recesses avoiding the keys in the inside areas at the 0-degree position, the 90-degree position, the 180-degree position, and the 270-degree position; and the first core sheet and the second core sheet are alternately laminated while being rotated 90 degrees in the third process.

A fourth aspect of the present invention provides the method according to the third aspect, wherein the first to fourth auxiliary holes formed in a circumferential direction are symmetric with respect to the keys.

A fifth aspect of the present invention provides a rotor core manufactured by the method according to the second aspect, comprising: the keys opposite to each other at the 0-degree position and the 180-degree position of the shaft hole; and concaves at both sides of the keys, the concaves forming parts of the outside areas and located outside the shaft hole.

A sixth aspect of the present invention provides the rotor core manufactured by the method according to the third aspect, comprising: cutout recesses formed at the 0-degree position, the 90-degree position, the 180-degree position, and the 270-degree position of the shaft hole, the cutout recesses partially cutting a circumference of the shaft hole, the circumference forming a true circle in plan view.

Here, in the first to sixth aspects, the 0-degree position, the 90-degree position, the 180-degree position, and the 270-degree position denote relative angles, and thus the positions do not define specific positions of the shaft hole.

Advantageous Effects of Invention

In the method according to the first to fourth aspects, the punched holes forming the outlines of the keys and the shaft hole including the recesses to avoid the keys are separately punched out and formed in the thin metal strip. Therefore, it is possible to separately manage (maintain) the first punch and the first die having shorter life spans and the second punch and the second die having longer life spans in an efficient manner.

Specifically, since the punched holes formed by the first punch and the first die include the inside areas and the outside areas forming the outlines of the keys where the outside areas are continuous with the inside areas and located outside the shaft hole, punching lines in the first process and punching lines in the second process can be separated. Thereby, punching positions in the first process and punching positions in the second process are different (i.e., a part of the outlines punched out overlap), thus metal clippings are prevented from being formed.

In the method according to the second aspect and the rotor core according to the fifth aspect, in addition to the functions and effects described above, the keys are disposed opposite to each other at the 0-degree position and the 180-degree position of the shaft hole, and the core sheets are rotated 180 degrees and laminated in the third process. Therefore, even if a thickness or a magnetism of the thin strip material is different between one side and the other side thereof, a physical property in a circumferential direction of the rotor core can be maintained constant with the keys provided constantly at identical positions (of the core sheets forming the rotor core).

Specifically, in the methods according to the third and fourth aspects and the rotor core according to the sixth aspect, in addition to the functions and effects described above, the keys protruding inward in the shaft hole can be formed at the 0-degree position and the 180-degree position of the shaft hole without rotating the first punch, the first die, the second punch, and the second die.

Further, since the core sheets can be rotated 90 degrees and laminated, the rotor core having a homogeneous thickness and a homogeneous magnetism can be produced.

In the method according to the fourth aspect, the first to fourth auxiliary holes are formed circumferentially symmetrical with respect to the keys. Therefore, it is certain that blades are worn evenly, and the core sheets are further uniformly-shaped.

In the rotor core according to the sixth aspect, since the cutout recesses partially cutting the perfectly-circular circumference of the shaft hole are formed at the 0-degree position, the 90-degree position, the 180-degree position, and the 270-degree position of the shaft hole of the rotor core, the shaft inserted through the shaft hole comes in contact with the shaft hole separately along arcs of approximately 90 degrees of the shaft hole. Therefore, the shaft hole and the shaft come in contact uniformly with each other, and the stress concentrations are reduced, thereby the shaft can be positioned further precisely in the shaft hole.

DESCRIPTION OF EMBODIMENTS

Referring to the accompanying drawings, embodiments of the present invention will be described for a better understanding of the invention.

A method of manufacturing a rotor core according to a first embodiment of the present invention will be described, but for an easier understanding, a rotor core 10 manufactured by the method will be described first. Here, if the rotor core 10 and a core sheet 11 used therein have an identical shape when viewed in plan, the same reference signs will be used. (Likewise in the following other embodiments.)

Figure 2:
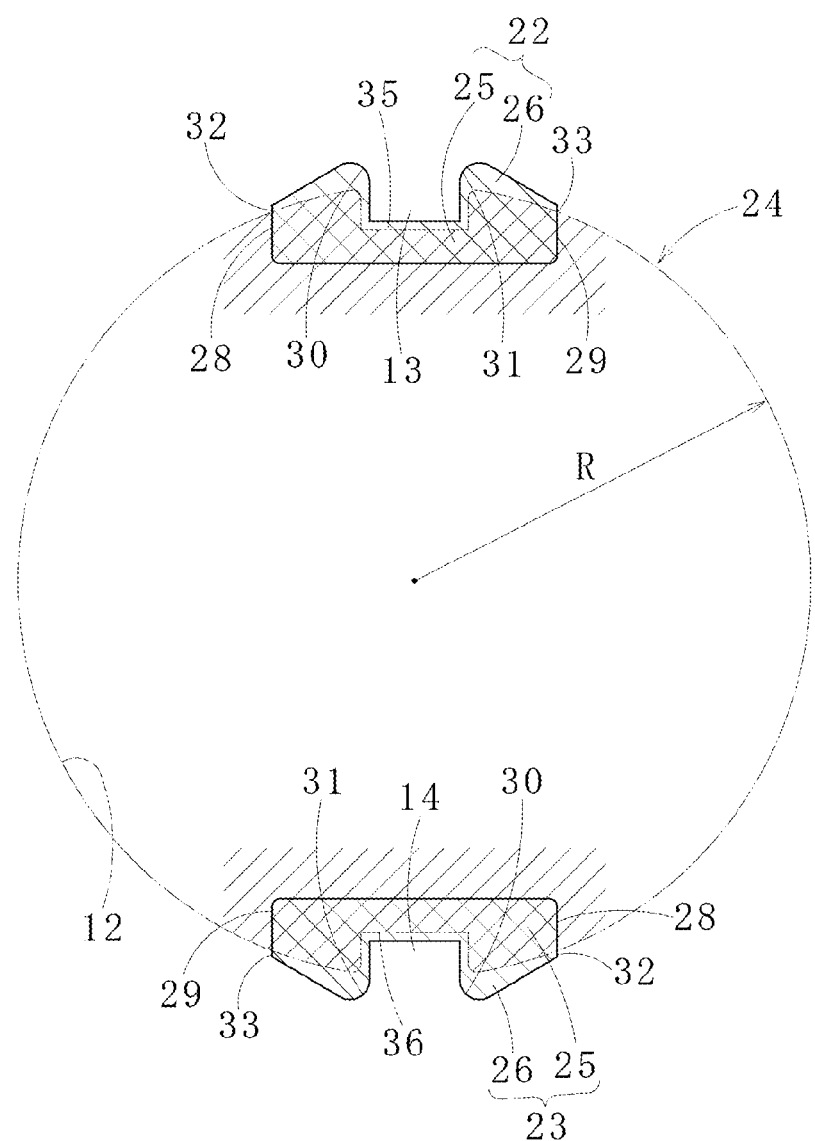
FIG. 2 is an enlarged plan view showing punched holes in a first process of the method.
Figure 3:
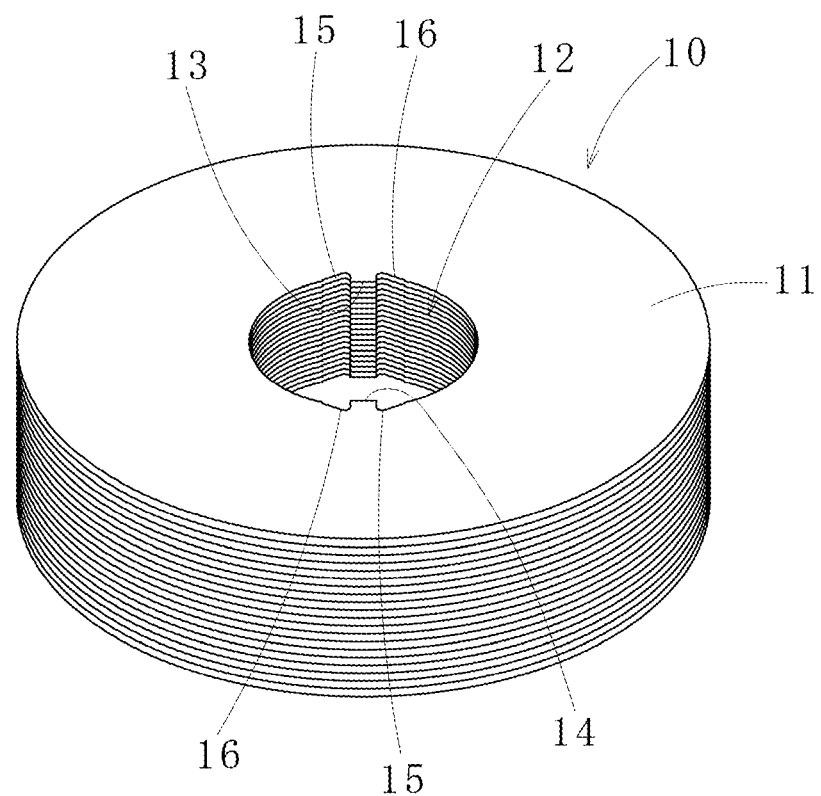
FIG. 3 is a perspective view showing the rotor core manufactured by the method.

As shown in FIG. 3, the rotor core 10 is manufactured by laminating a plurality of the core sheets 11 each having a thickness of 0.15 to 0.5 mm. A shaft hole 12 having a radius R (see FIG. 2) is formed in a center of the rotor core 10, and a plurality of unillustrated magnet insertion holes (see FIGS. 3, 4 of Patent Literature 2) are formed radially outside the shaft hole 12. Keys 13, 14 projecting toward a radially inward side of the rotor core 10 are provided at a 0-degree position and an opposing 180-degree position of the shaft hole 12. On both sides of the keys 13 and 14, concaves 15 and 16 are provided. Here, the concaves 15, 16 extend radially outward from an outline of the shaft hole 12 (i.e., a circumference of the a circle with the radius R) and are recessed radially outward with steps from the outline of the shaft hole 12. The core sheets 11 are fixed by caulking and laminating, welding, bonding, or the like to form the one rotor core 10. (Likewise in the following other embodiments.)

Figure 1:
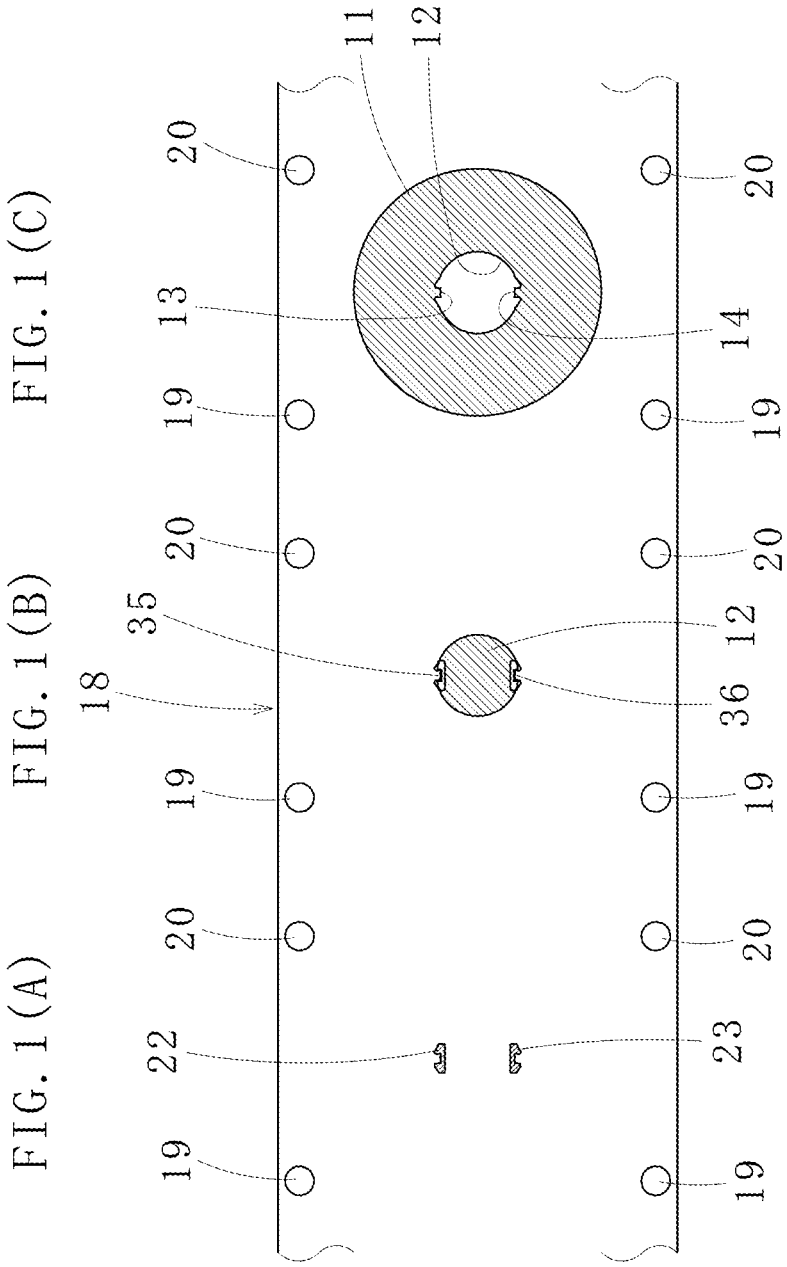
FIG. 1 is an explanatory diagram showing a method of manufacturing a rotor core according to a first embodiment of the present invention.

Referring to FIGS. 1 and 2, the method of manufacturing the rotor core 10 will be described.

A magnetic thin metal strip 18 made of a hoop material is conveyed into an unillustrated press machine by using pilot holes 19, 20 provided in advance on both sides in a width direction of the thin metal strip 18 as guides. The thin metal strip 18 is conveyed by a pitch between the pilot holes 19 (equal to a pitch between the pilot holes 20) in synchronization with one pressing motion of unillustrated punch and die in the press machine.

As shown in FIGS. 1(A) and 2, in the thin metal strip 18, punched holes 22, 23 forming outlines of the keys 13, 14 are punched out by an unillustrated pair of first punch and die. The punched holes 22, 23 are opposite to each other at the 0-degree position and the 180-degree position in a circumferential direction of the shaft hole 12 (First Process). In this embodiment, the 0-degree position and the 180-degree position are located in a width direction of the thin metal strip 18.

As shown in FIG. 2, each of the punched holes 22, 23 includes an inside area 25 and an outside area 26. The inside area 25 is located inside a circumference 24 of the shaft hole 12, and the outside area 26 continuous from the inside area 25 is located outside the circumference 24 of the shaft hole 12. The inside area 25 includes an outline of a main part (i.e., radially inward part) of the key 13 (14), and the outside area 26 includes an outline of a base of the key 13 (14). The inside area 25 and the outside area 26 are continuous with each other via straight outlines 28, 29. The outside area 26 includes arc-shaped concaves 30, 31 at the base of the key 13 (14) so that stresses are not concentrated at the base of the key 13 (14). (Likewise in the following other embodiments.)

The circumference 24 crosses the outlines 28, 29 of the punched holes 22, 23 excluding the ends of the outlines 28, 29. Lateral sides of the outside areas 26 form steps 32, 33 having widths in a radial direction of the shaft hole 12, and are connected to the inside area 25.

As shown in FIG. 1(B), the shaft hole 12 is punched out by an unillustrated second punch and an unillustrated second die paired with the second punch. The shaft hole 12 includes recesses 35, 36 avoiding the keys 13, 14, and is continuous with the punched holes 22, 23 (Second Process). A cutting line of the second punch and the second die is shown as a two-dot chain line in FIG. 2.

Thereafter, as shown in FIG. 1(C), an outline of the core sheet 11 is punched out, and the punched-out core sheets 11 are laminated in the die. In this embodiment, the core sheets 11 are caulked and laminated by unillustrated caulking portions provided at predetermined positions in each of the core sheets 11.

Here, by an unillustrated well-known die rotating mechanism, the die is rotated 180 degrees each time the one core sheet 11 is laminated. If the thin metal strip 18 has difference in thickness or magnetism in the width direction, a property of the rotor core 10 is homogenized by rotating the laminated core sheets 180-degree before laminating the subsequent core sheet thereon (Third Process).

Figure 7:
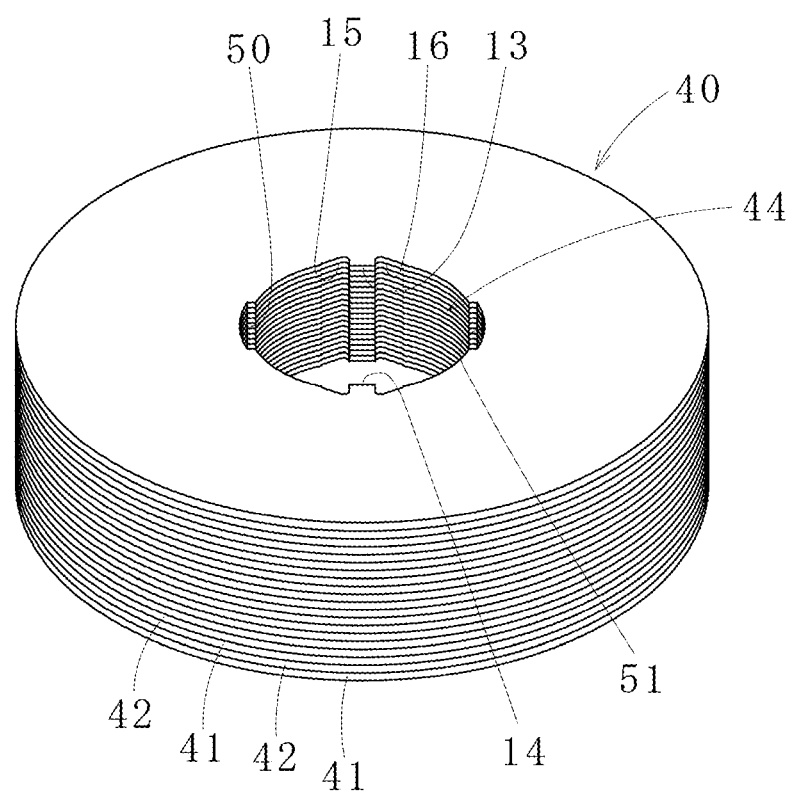
FIG. 7 is a perspective view showing the rotor core manufactured by the method.

Hereinafter, a method of manufacturing a rotor core 40 according to a second embodiment of the present invention will be described. Referring to FIG. 7, a basic configuration of the rotor core 4 will be described first. Here, elements with the same configurations as those in the rotor core 10 and the core sheet 11 according to the first embodiment are numbered accordingly, and detailed descriptions of the elements will be omitted.

Figure 4:
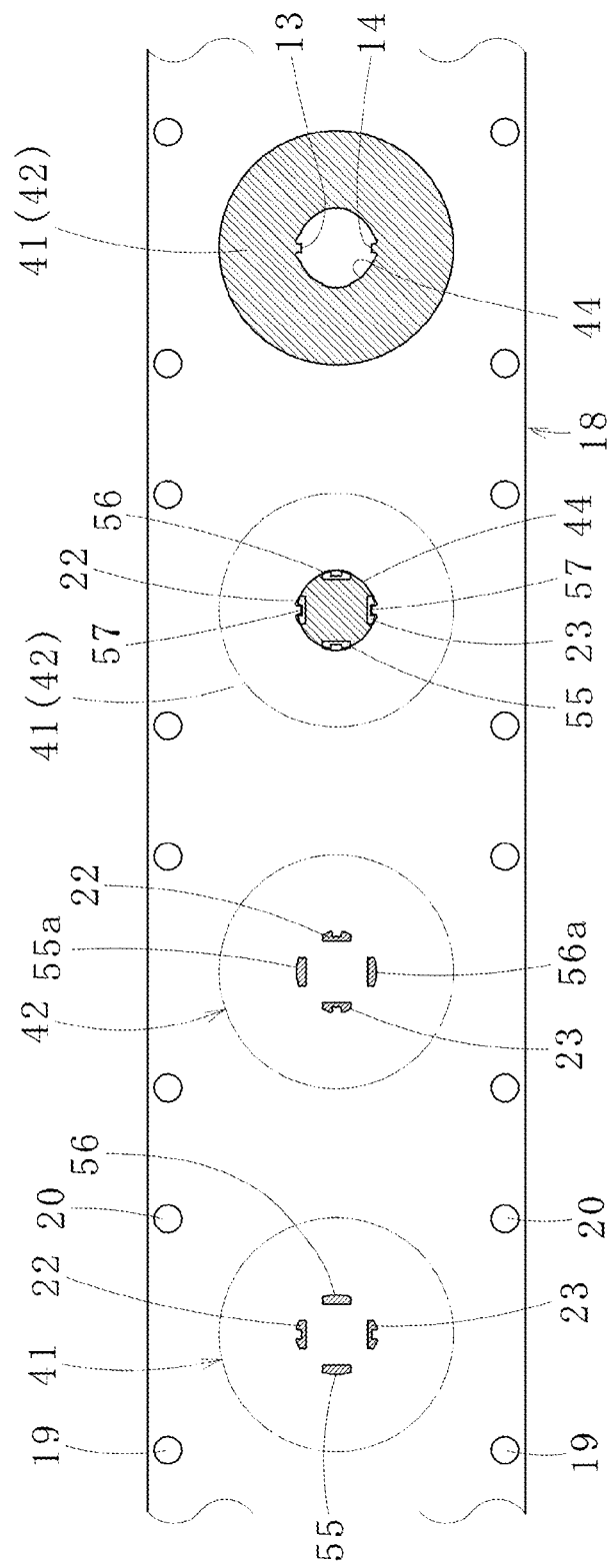
FIG. 4 is an explanatory diagram showing a method of manufacturing a rotor core according to a second embodiment of the present invention.

As shown in FIG. 7, the rotor core 40 is formed by alternately laminating a plurality of core sheets 41, 42 (examples of a first core sheet and a second core sheet) punched out from the thin metal strip 18 (see FIG. 4). The rotor core 40 includes a shaft hole 44 in a center thereof and a plurality of unillustrated magnet insertion holes around the shaft hole 44 (see FIGS. 3, 4 of Patent Literature 2).

The rotor core 40 includes the keys 13, 14 opposite to each other at a 0-degree position and a 180-degree position of the shaft hole 44. Recessed grooves 50, 51 are respectively formed at a 90-degree position and a 270-degree position of the shaft hole 44. Outer lines 54 (see FIG. 5) of the recessed grooves 50, 51 are located radially outside a true circle with an inner diameter of the shaft hole 44. Here, the recessed grooves 50, 51 are formed by regions of auxiliary holes 55, 56, 55a, 56a (described later) in a radially outward direction of the shaft hole 44. Thus, the core sheet 41 (42) forming the rotor core 40 can be laminated on the core sheet 42 (41) while one is rotated by 90 degrees to the other. Also, the recessed grooves 50, 51 form cutout recesses partially cutting the circumference of the shaft hole 44, which is a true circle, at the 90-degree position and the 270-degree position of the shaft hole 44. Further, steps are formed by the outer lines 54 and line segments on both sides of the outer lines 54 directing from the circumference to a radially outward side of the shaft hole 44.

The concaves 15, 16 are provided on both sides of the keys 13, 14 of the rotor core 40. Here, the concaves 15, 16 extend radially outward from the outline of the shaft hole 44 and are recessed toward the radially outward side with the steps from the circumference (a perfect circle in plan view) of the shaft hole 44. The concaves 15, 16 form cutout recesses cutting the circumference (a perfect circle) of the shaft hole 44 at a 0-degree position and a 180-degree position of the shaft hole 44.

As is clear from the above description, the cutout recesses partially cutting the circumference (a true circle) of the shaft hole 44 are provided at the 0-degree position, the 90-degree position, the 180-degree position, and the 270-degree position of the shaft hole 44 of the rotor core 40. Therefore, contact between a shaft and a shaft hole is improved, stress concentration is reduced, and thus the shaft can be fixed to the shaft hole more firmly and properly.

The core sheets 41, 42 of the rotor core 40 are fixed by caulking and laminating, welding, bonding, or the like.

Hereinafter, a method of manufacturing the rotor core 40 will be described.

Figure 5:
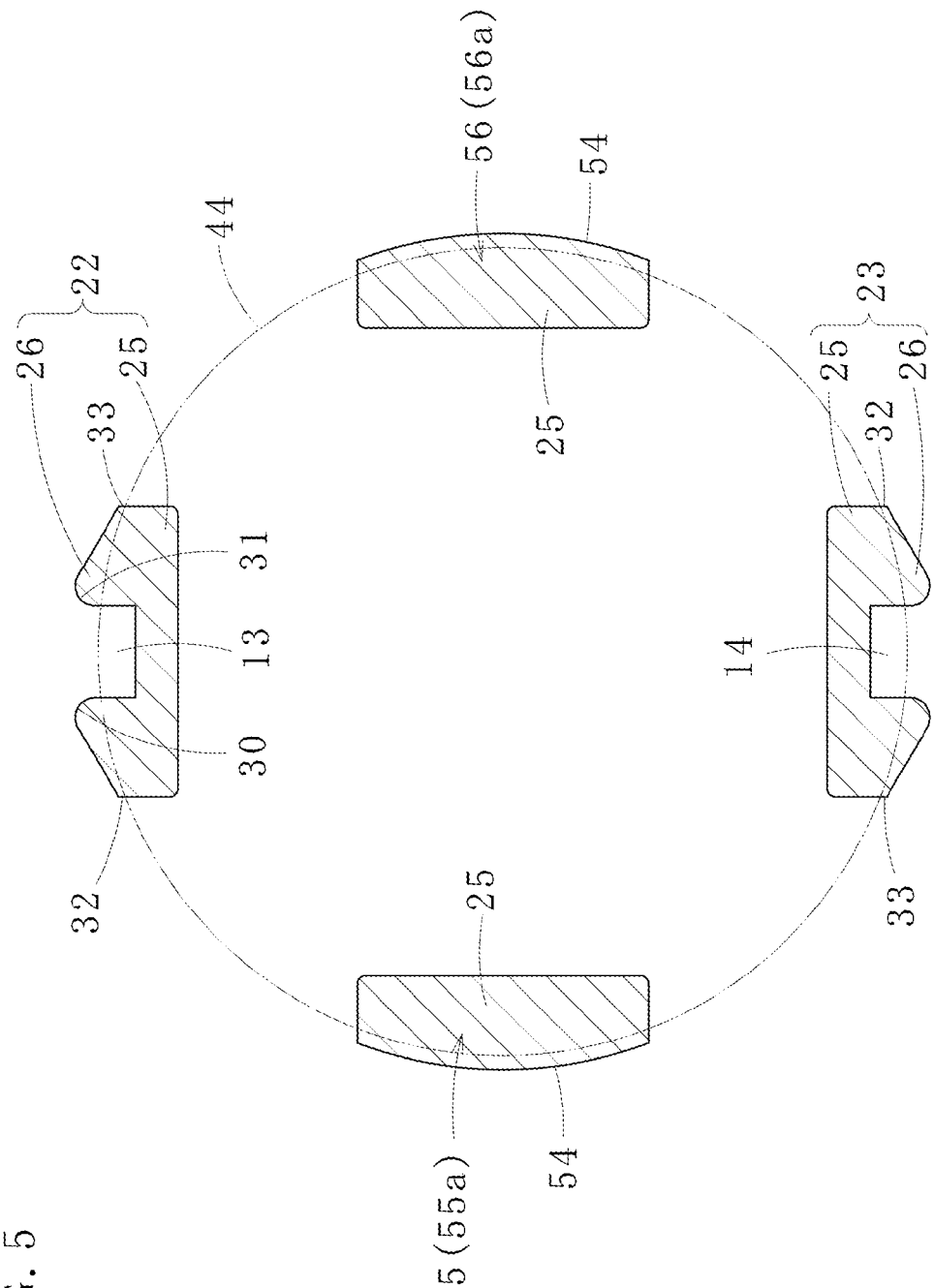
FIG. 5 is an enlarged plan view showing punched holes and auxiliary holes in a first process of the method.

As shown in FIGS. 4(A) and 4(B), to manufacture the rotor core 40, the core sheets 41 and 42 of different types are respectively manufactured. As shown in FIGS. 4(A) and 5, to form the core sheet 41, the punched holes 22 and 23 forming the outlines of the keys 13 and 14 are made respectively at the 0-degree position and the 180-degree position of the shaft hole 44 by the first punch and the first die. In the same way as the method of manufacturing the rotor core according to the first embodiment, the punched holes 22, 23 include the inside areas 25 including the outlines of the keys 13, 14 and the outside areas 26. Here, the inside area 25 is located inside the shaft hole 44, and the outside area is continuous from the inside area 25 via straight lines (the outlines 28, 29) and is located outside the shaft hole 44.

As shown in FIG. 5, at the 90-degree position and the 270-degree position of the shaft hole 44 of the core sheet 41, a first auxiliary hole 55 and a second auxiliary hole 56 are respectively formed in a bilaterally symmetrical manner. Here, each of the first auxiliary hole 55 and the second auxiliary hole 56 includes the inside area 25 and an outer line 54 located radially outside the circumference of the shaft hole 44. Widths in circumferential directions of the auxiliary holes 55, 56 must be larger than widths in circumferential directions of the keys 13, 14. Normally, it is preferable that the widths in the circumferential directions of the auxiliary holes 55, 56 are the same as widths in circumferential directions of the punched holes 22, 23.

As shown in FIG. 4(B), the core sheet 42 is manufactured in a different process (at a different position) from that of the core sheet 41 by using a different die device (punch and die) from that for manufacturing the core sheet 41. In the core sheet 42, by the first punch and the first die, a third auxiliary hole 55a and a fourth auxiliary hole 56a are respectively formed at the 0-degree position and the 180-degree position of the shaft hole 44 and the punched holes 22 and 23 are respectively formed at the 90-degree position and the 270-degree position of the shaft hole 44. Therefore, if the core sheet 41 is rotated 90 degrees, a shape thereof is identical with a shape of the core sheet 42. Thus, the concaves 30, 31 of the core sheet 41 coincide with the outside areas of the auxiliary holes 55a, 56a, and the concaves 30, 31 of the core sheet 42 coincide with the outside areas of the auxiliary holes 55, 56.

Here, it is preferable that (1) the punches and the dies for processing the punched holes 22, 23 and the auxiliary holes 55, 56 to manufacture the core sheet 41 are made as the one die device and (2) the punches and the dies for processing the punched holes 22, 23 and the auxiliary holes 55a, 56a to manufacture the core sheet 42 are made as the another die device, and that the die devices operate simultaneously (First Process).

Figure 6:
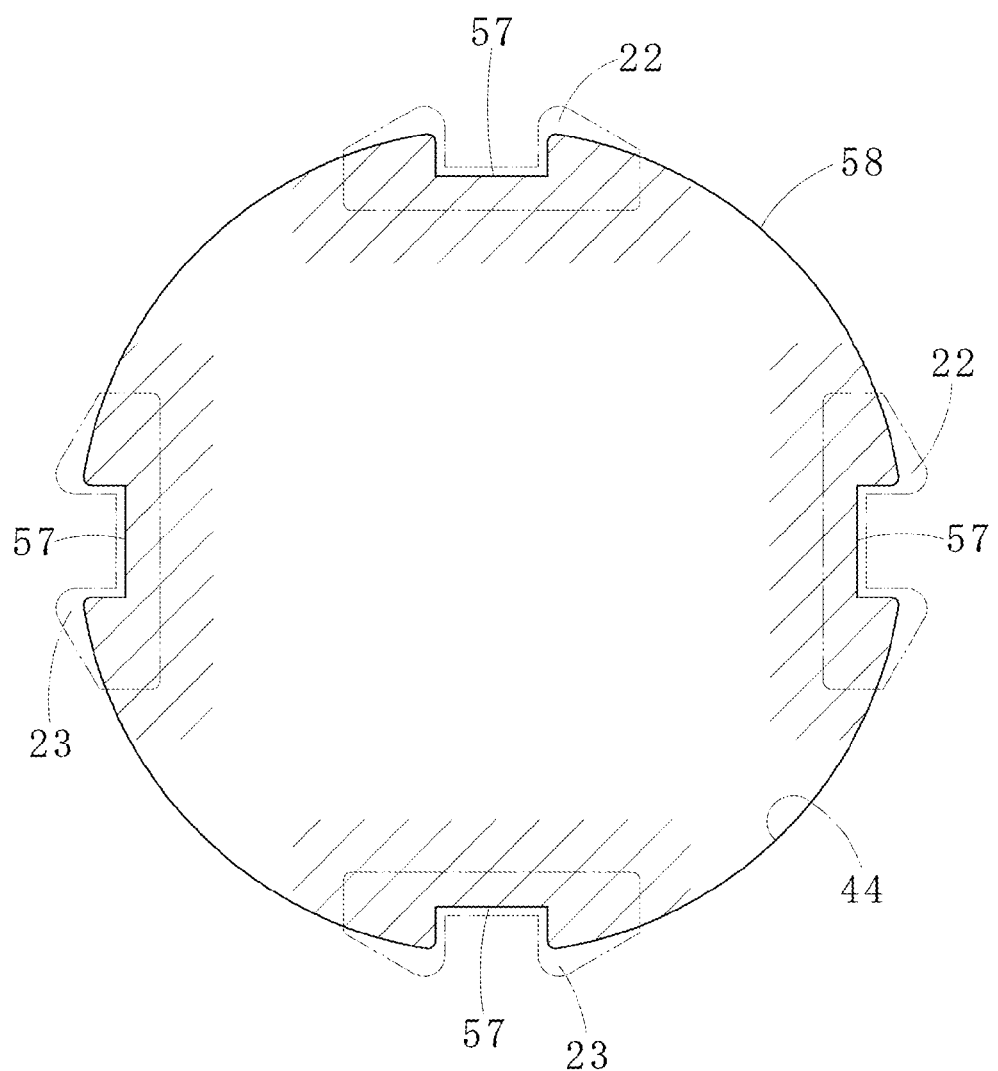
FIG. 6 is a cross-sectional view showing a second punch to form a shaft hole.

Thereafter, as shown in FIG. 4(C), the shaft hole 44 and recesses 57 to avoid the keys 13, 14 are formed in each of the core sheets 41, 42 by the second punch and the second die. The second punch and the second die include, in addition to a blade for making the shaft hole 44, blades for making the recesses 57 to punch out the inside areas 25 at the 0-degree position, the 90-degree position, the 180-degree position, and the 270-degree position of the shaft hole 44. In FIG. 6, a solid line shows an outline 58 of a shape cut by the second punch and the second die. In FIG. 6, the punched holes 22, 23 formed in the core sheet 41 (at the 0-degree position and the 180-degree position) and the punched holes 22, 23 formed in the core sheet 42 (at the 90-degree position and the 270-degree position) are also shown. Here, the recesses 57 to avoid the keys 13, 14 are formed, and an outer line of the shaft hole 44 (the outline 58) connecting the recesses 57 is also formed.

The outline 58 does not have a long overlap with the punched holes 22, 23 shown as two-dotted chain lines, i.e., an identical outline is not punched out twice, thus linear metal clippings (scrap strips), etc. are not produced. Each of the core sheets 41, 42 including the shaft hole 44 provided with the keys 13, 14 having the same shape as the shaft hole 12 of the rotor core 10 is formed as described above (Second Process).

Thereafter, as shown in FIG. 4(D), outlines of the core sheets 41, 42 are punched out, and the core sheets 41, 42 are laminated in the die. Here, each time one of the core sheets 41, 42 is laminated, the laminated core sheets 41, 42 are rotated 90 degrees (i.e., the die is rotated 90 degrees) before the subsequent core sheet 41 (or 42) is laminated thereon. Thereby, from the thin metal strip 18 having a difference in thickness in the width direction and a difference in magnetism between a length direction and the width direction, the rotor core 40 having a more homogeneous thickness and a more homogeneous magnetism can be manufactured (Third Process).

Hereinafter, the method of manufacturing the rotor core according to the second embodiment of the present invention is summarized: the core sheet 41 and the core sheet 42 are manufactured in different processes, where the core sheet 41 includes the punched holes 22 and 23 respectively formed at the 0-degree position and the 180-degree position and the first auxiliary hole 55 and the second auxiliary hole 56 respectively formed at the 90-degree position and the 270-degree position, and the core sheet 42 includes the punched holes 22 and 23 respectively formed at the 90-degree position and the 270-degree position and the third auxiliary hole 55a and the fourth auxiliary hole 56a respectively formed at the 0-degree position and the 180-degree position; the shaft holes 44 of the core sheets 41, 42 are punched out in one process; and the outlines of the core sheets 41, 42 are punched out, and then the core sheets 41, 42 are rotated 90 degrees and laminated in a final process.

In making the shaft hole 44 of the core sheet 41 at predetermined positions in the thin metal strip 18, the punched holes 22, 23 forming the outlines of the keys 13, 14 are formed at the 0-degree position and the 180-degree position, and the first auxiliary hole 55 and the second auxiliary hole 56 are respectively formed at the 90-degree position and the 270-degree position. Here, the punched holes 22, 23 include the inside areas 25 located inside the shaft hole 44 and the outside areas 26 continuous from the inside areas 25 and located outside the shaft hole 44.

In making the shaft hole 44 of the core sheet 42 at predetermined positions in the thin metal strip 18, the punched holes 22, 23 forming the outlines of the keys 13, 14 are formed at the 90-degree position and the 270-degree position, and the third auxiliary hole 55a and the fourth auxiliary hole 56a are respectively formed at the 0-degree position and the 180-degree position. Here, the punched holes 22, 23 include the inside areas 25 located inside the shaft hole 44 and the outside areas 26 continuous from the inside areas 25 and located outside the shaft hole 44.

It is preferable that the first to fourth auxiliary holes 55, 56, 55a, 56a are formed circumferentially symmetrical with respect to the keys 13, 14.

The present invention is not limited to the embodiments described above. For example, the present invention is applicable to a rotor core having a lightening hole vertically penetrating the rotor core and to a rotor core in which the number and positions of the magnet insertion holes are different.

REFERENCE SIGNS LIST

10: rotor core, 11: core sheet, 12: shaft hole, 13, 14: key, 15, 16: concave, 18: thin metal strip, 19, 20: pilot hole, 22, 23: punched hole, 24: circumference, 25: inside area, 26: outside area, 28, 29: outline, 30, 31: concave, 32, 33: step, 35, 36: recess, 40: rotor core, 41, 42: core sheet, 44: shaft hole, 50, 51: recessed groove, 54: outer line, 55: first auxiliary hole, 56: second auxiliary hole, 55a: third auxiliary hole, 56a: fourth auxiliary hole, 57: recess, 58: outline

The invention claimed is:

1. A method of manufacturing a rotor core, the rotor core formed by laminating a plurality of core sheets each punched out from a magnetic thin metal strip, each of the core sheets including a shaft hole in a center, the shaft hole including keys protruding radially inward of the core sheet, the method comprising:

a first process of punching out punched holes in the thin metal strip by a first punch and a first die paired with the first punch, the punched holes forming outlines of the keys, the punched holes including inside areas located inside the shaft hole and outside areas continuous with the inside areas and located outside the shaft hole;

a second process of punching out the shaft hole by a second punch and a second die paired with the second punch, the shaft hole continuous with the punched holes, the shaft hole including recesses to avoid the keys; and a third process of punching out outlines of the core sheets each provided with the shaft hole and laminating the core sheets.

2. The method as defined in claim 1, wherein the keys are disposed opposite to each other at a 0-degree position and a 180-degree position of the shaft hole, and the core sheets are rotated 180 degrees to the core sheet to be laminated on the core sheets in the third process.

3. A rotor core manufactured by the method as defined in claim 2, comprising:
   the keys opposite to each other at the 0-degree position and the 180-degree position of the shaft hole; and
   concaves at both sides of the keys, the concaves forming parts of the outside areas and located outside the shaft hole.

4. The method as defined in claim 1, wherein the core sheets whose outlines are punched out in the third process include a first core sheet and a second core sheet formed at different positions in the thin metal strip;
   the first core sheet includes the punched holes, a first auxiliary hole, and a second auxiliary hole formed in the first process, the punched holes opposite to each other at a 0-degree position and a 180-degree position of the shaft hole formed in the second process, the first auxiliary hole and the second auxiliary hole formed at a 90-degree position and a 270-degree position of the shaft hole, the first and second auxiliary holes including the inside areas, outer lines of the first and second auxiliary holes located outside the shaft hole;
   the second core sheet includes the punched holes, a third auxiliary hole, and a fourth auxiliary hole formed in the first process, the punched holes opposite to each other at the 90-degree position and the 270-degree position of the shaft hole formed in the second process, the third auxiliary hole and the fourth auxiliary hole formed at the 0-degree position and the 180-degree position of the shaft hole, the third and fourth auxiliary holes including the inside areas, the outer lines of the third and fourth auxiliary holes located outside the shaft hole;
   the second punch and the second die include a blade to form the shaft hole, blades to punch out the recesses avoiding the keys in the inside areas at the 0-degree position, the 90-degree position, the 180-degree position, and the 270-degree position;
   and the first core sheet and the second core sheet are alternately laminated while being rotated 90 degrees in the third process.

5. The method as defined in claim 4, wherein the first to fourth auxiliary holes formed in a circumferential direction are symmetric with respect to the keys.

6. A rotor core manufactured by the method as defined in claim 4, comprising:
   cutout recesses formed at the 0-degree position, the 90-degree position, the 180-degree position, and the 270-degree position of the shaft hole, the cutout recesses partially cutting a circumference of the shaft hole, the circumference forming a true circle in plan view.

\* \* \* \* \*